United States Patent [19]

Connors et al.

[11] Patent Number: 5,375,132
[45] Date of Patent: Dec. 20, 1994

[54] SOLID STATE LASER WITH INTERLEAVED OUTPUT

[75] Inventors: Kevin P. Connors, Sunnyvale; James L. Hobart, Los Altos Hills; Edward D. Reed, Sunnyvale; David Trost, San Francisco, all of Calif.; Kenneth J. Bossie; Thomas W. McCurnin; Gerald M. Mitchell; J. Michael Yarborough, all of Tucson, Ariz.

[73] Assignee: Coherent, Inc., Santa Clara, Calif.

[21] Appl. No.: 57,084

[22] Filed: May 5, 1993

[51] Int. Cl.$^5$ .................... H01S 3/042; H01S 3/102
[52] U.S. Cl. ........................... 372/34; 372/30; 372/35; 372/68; 372/70; 372/15; 372/97; 372/99
[58] Field of Search ............ 372/68, 97, 99, 15, 372/70, 72, 35, 34, 30, 23

[56] References Cited

U.S. PATENT DOCUMENTS

| | | | |
|---|---|---|---|
| 3,443,243 | 5/1969 | Patel | 372/23 |
| 3,444,479 | 5/1969 | Harris et al. | 372/23 |
| 3,543,183 | 11/1970 | Heimann | 372/23 |
| 3,665,338 | 5/1972 | Harris et al. | 372/23 |
| 3,731,110 | 5/1973 | Dewey, Jr. | 307/88.3 |
| 3,772,609 | 11/1973 | Willett et al. | 372/23 |
| 3,924,937 | 12/1975 | Munroe et al. | 372/97 X |
| 3,938,058 | 2/1976 | Yamamoto | 372/23 |
| 4,114,112 | 9/1978 | Epstein et al. | 372/23 |
| 4,217,558 | 8/1980 | Aprahaman et al. | 372/97 X |
| 4,241,318 | 12/1980 | Comera et al. | 372/23 |
| 4,338,578 | 7/1982 | Sukhman | 372/23 |
| 4,408,602 | 10/1983 | Nakajima | 606/10 |
| 4,441,186 | 4/1984 | Erickson | 372/19 |
| 4,450,563 | 5/1984 | Bepko | 372/23 |
| 4,502,144 | 2/1985 | Suhre | 172/23 |
| 4,573,465 | 3/1986 | Sugiyama et al. | 372/23 |
| 4,601,036 | 7/1986 | Faxvog et al. | 372/20 |
| 4,627,068 | 12/1986 | Johnson et al. | 372/101 |
| 4,630,273 | 12/1986 | Inoue et al. | 372/9 |
| 4,672,969 | 6/1987 | Dew | 606/16 X |
| 4,674,091 | 6/1987 | Colson | 372/20 |
| 4,674,096 | 6/1987 | Salzman et al. | 372/50 |
| 4,677,636 | 6/1987 | Laudenslager et al. | 372/68 |
| 4,751,706 | 6/1988 | Rohde et al. | 372/23 |
| 4,761,059 | 8/1988 | Yeh et al. | 372/21 X |
| 4,823,351 | 4/1989 | Endemann et al. | 372/20 |
| 4,910,746 | 3/1990 | Nicholson | 372/68 |
| 4,917,084 | 4/1990 | Sinofsky | 606/7 |
| 4,920,541 | 4/1990 | Baumgartner et al. | 372/23 |
| 4,922,502 | 5/1990 | Unternahrer et al. | 372/66 |
| 4,978,197 | 12/1990 | Horikawa | 359/629 |
| 4,982,166 | 1/1991 | Morrow | 359/349 |
| 4,998,259 | 3/1991 | Chandra et al. | 372/68 |
| 5,037,421 | 8/1991 | Boutacoff et al. | 606/15 |
| 5,048,030 | 9/1991 | Hiiro | 372/68 |
| 5,107,513 | 4/1992 | Sagie et al. | 372/35 |
| 5,139,494 | 8/1992 | Freiberg | 606/10 |
| 5,172,264 | 12/1992 | Morrow | 372/97 X |
| 5,272,713 | 12/1993 | Sobey et al. | 372/69 |

FOREIGN PATENT DOCUMENTS

| | | | |
|---|---|---|---|
| 0368512 | 5/1990 | European Pat. Off. | A61B 17/36 |
| 2809007 | 3/1978 | Germany | A61B 17/36 |
| 3904287 | 9/1989 | Germany | B23K 26/00 |
| 4009859 | 3/1990 | Germany | H01S 3/23 |

OTHER PUBLICATIONS

Solid-State Laser Engineering, By Walter Koechner, p. 373, 1988.

Primary Examiner—Rodney B. Bovernick
Assistant Examiner—Hermang Sanghavi
Attorney, Agent, or Firm—Limbach & Limbach

[57] ABSTRACT

A pulsed solid state laser system is disclosed which utilizes a plurality of individual laser rods which are sequentially pumped and whose beans are combined into a single interleaved output bean. The individual laser rods are pumped at an average power level which is below that for maximum output power from each rod, thereby obviating the need for refrigeration cooling. A compact optical system is disclosed which permits a constant beam size even at different pump levels and other advantages. A compact cooling system is also disclosed.

9 Claims, 13 Drawing Sheets

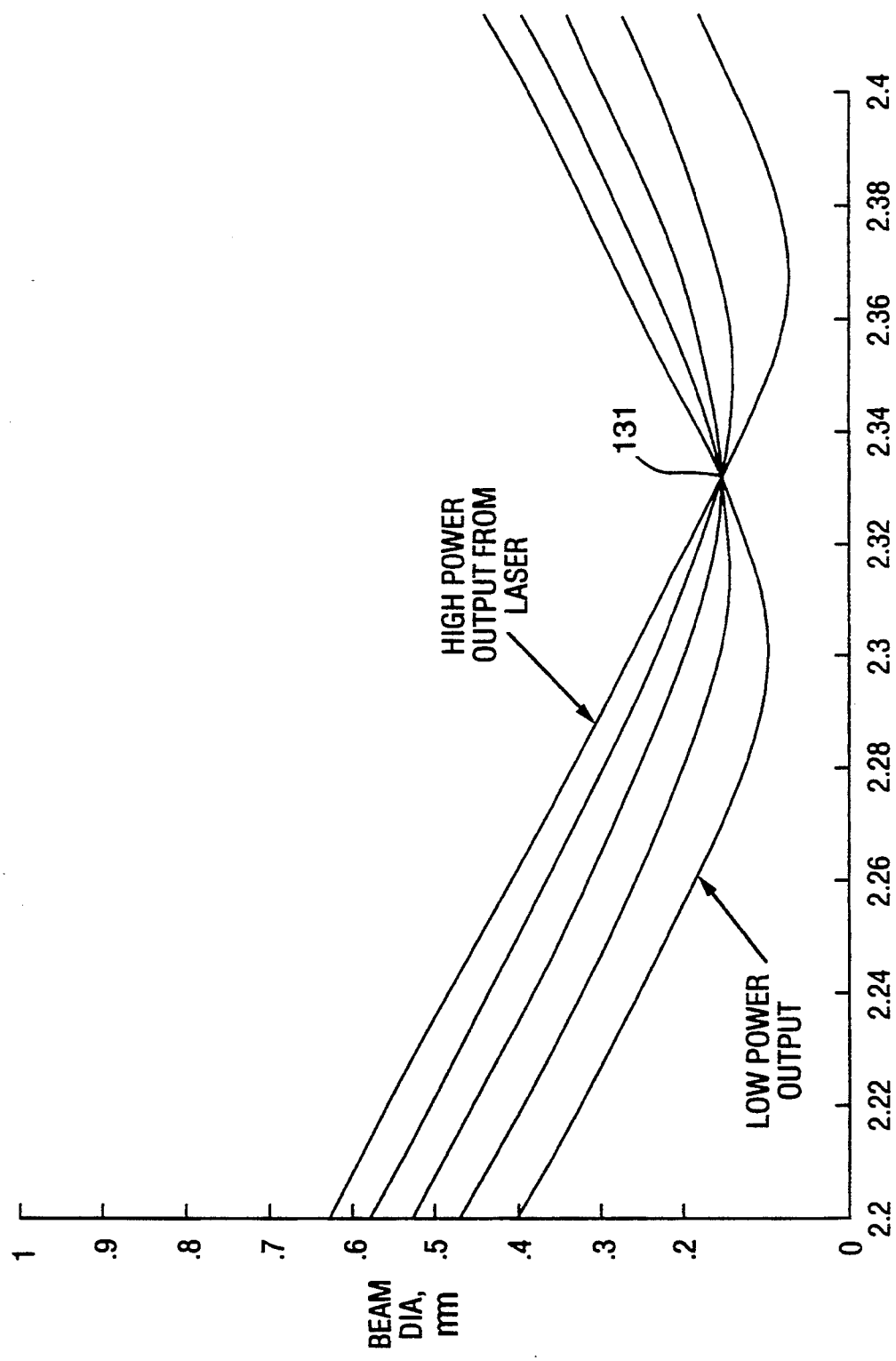

SOLID STATE LASER WITH INTERLEAVED OUTPUT

BACKGROUND OF THE INVENTION

1. Field of the Invention

The invention pertain to pulsed lasers, specifically to optically pumped solid state lasers. The present invention has particular application to optically-pumped lasers which include a plurality of laser rods and in which each laser rod is optically pumped at a level below its maximum output operation so that refrigeration cooling is not required.

2. Description of the Related Art

Many conventional solid state laser systems employ optical pumping means to excite solid state gain media into a lasing state. For example, in one type of conventional solid state laser system, the gain medium is a cylindrical rod, and the optical pumping means comprises elongated flash lamps positioned parallel to the rod. Radiation for optically pumping the rod is focused from the lamps onto the rod's central longitudinal axis. The rod and the adjacent flash lamps are mounted within a reflective housing. The entire assembly (comprising rod, flash lamps, and housing) is referred to as a "laser head."

Most solid state gain media in common use can be maintained at a relatively high temperature during lasing operation. However, some solid state gain media, such as Holmium:YAG material, Holmium:YLF material, and other Holmium-doped gain media, are preferably maintained at a low temperature during lasing operation (for example, a low temperature in the range from about +10 degrees Celsius to as low as about −15 degrees Celsius) for maximum power output. A cooling system is required for this purpose, since the flash lamps (or other optical pumping means) will otherwise increase the temperature of the entire laser head (including the gain medium) to undesirably high levels. Existing lasers use refrigerant cooling to achieve the range of temperatures specified above.

However, refrigerator-cooled Ho:YAG lasers have serious drawbacks. The cooling system typically is heavy, bulky, noisy, and expensive to fabricate. Also, there are problems in shipping laser systems with the typical water/alcohol refrigeration coolant.

Also, there are limits, even with refrigeration, on the rate at which a Ho:YAG laser can be pumped before the efficiency of the laser drops. Additionally, increasing the optical pumping rate and intensity runs the risk of damaging the Ho:YAG laser rod.

SUMMARY OF THE INVENTION

The invention is an optically-pumped solid state laser that has a plurality of laser rods, each of which is sequentially pumped. The outputs of each laser rod are combined into a single, pulsed, output beam. The individual laser rods are pumped at a power level less than that for maximum laser efficiency. Rather than pumping a single laser rod at a high repetition rate to maximize its output but necessitating the use of refrigeration cooling, a plurality of laser rods are used, and the repetitive rate for each individual laser rod is reduced. More specifically, the repetition rate is chosen to be at or less than the thermal relaxation time of the laser medium so that thermal build-up in the medium can be prevented using standard air/water cooling systems.

Since the repetitive rate for pumping each laser rod is reduced, refrigeration-cooling of each laser rod is not required. But since the output beam is a combination of each of the individual laser rods, the laser pulse rate and average energy level is high. In the case of an actual embodiment employing four Ho:YAG rods, each laser rod is pulsed at 10 Hz and the output of each rod is combined and interleaved into a single output beam. Its interleaved pulse rate is 40 Hz at a power level of 100 watts, which exceeds that of most refrigeration-cooled Ho:YAG lasers using a single rod.

In accordance with another aspect of the invention, an improved, compact optical system is provided for interleaving the outputs of the individual laser rods. The optical delivery system insures that the beam size is substantially independent of the laser pump power. This is important for many applications such as medical laser systems.

BRIEF DESCRIPTION OF THE DRAWINGS

FIG. 3 is a cross-sectional view of the laser of FIG. 2 in a direction and location indicated by the arrows marked 4—4.

FIG. 9A, 9B and 9C illustrate the diameter of the laser beams within the optical system as a function of the distance from the laser cavity and as a function of pump power.

DETAILED DESCRIPTION OF THE PREFERRED EMBODIMENT

Figure 1:
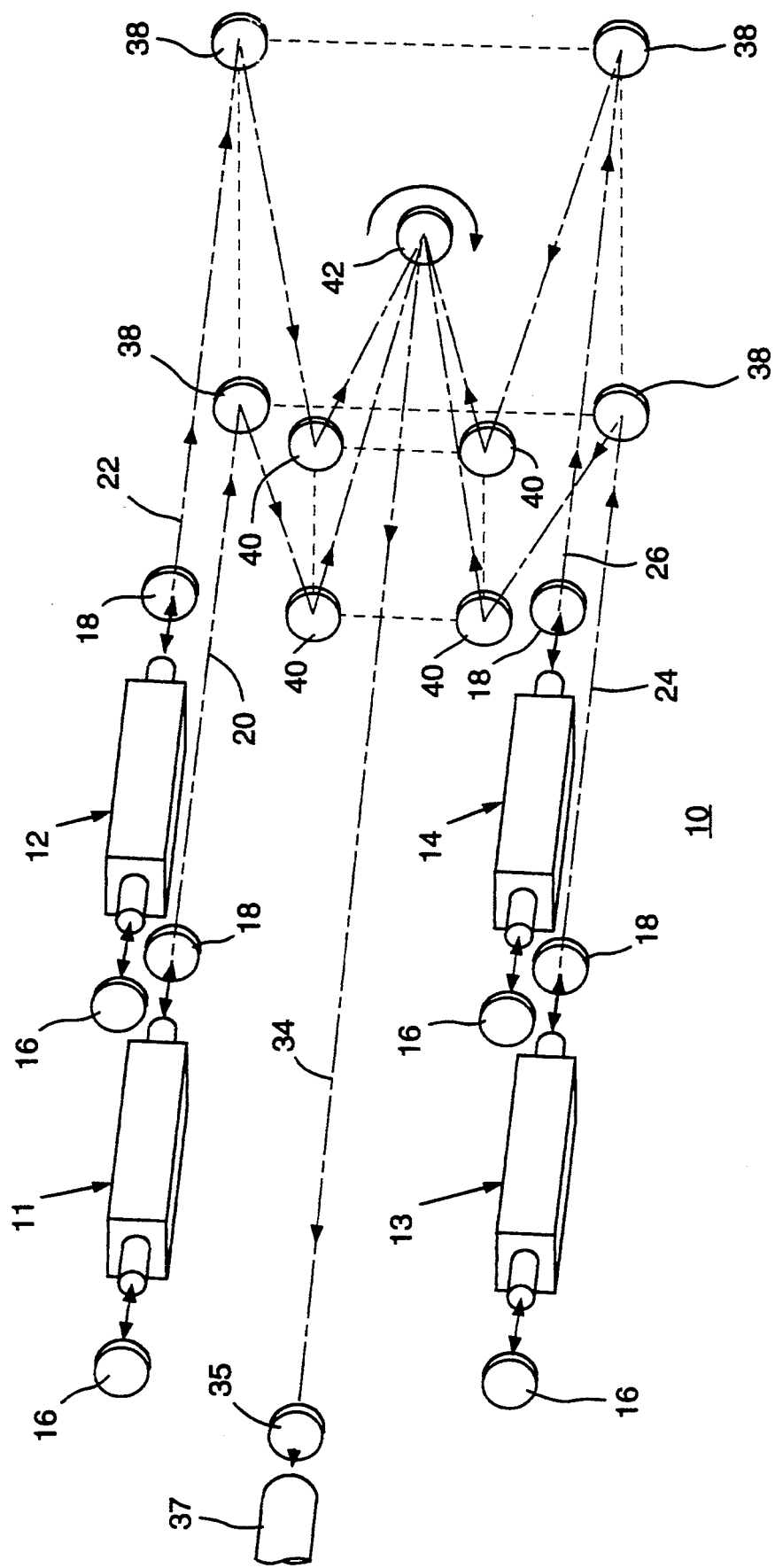
FIG. 1 is a perspective, diagrammatic view of a solid state laser which embodies the invention.
Figure 2:
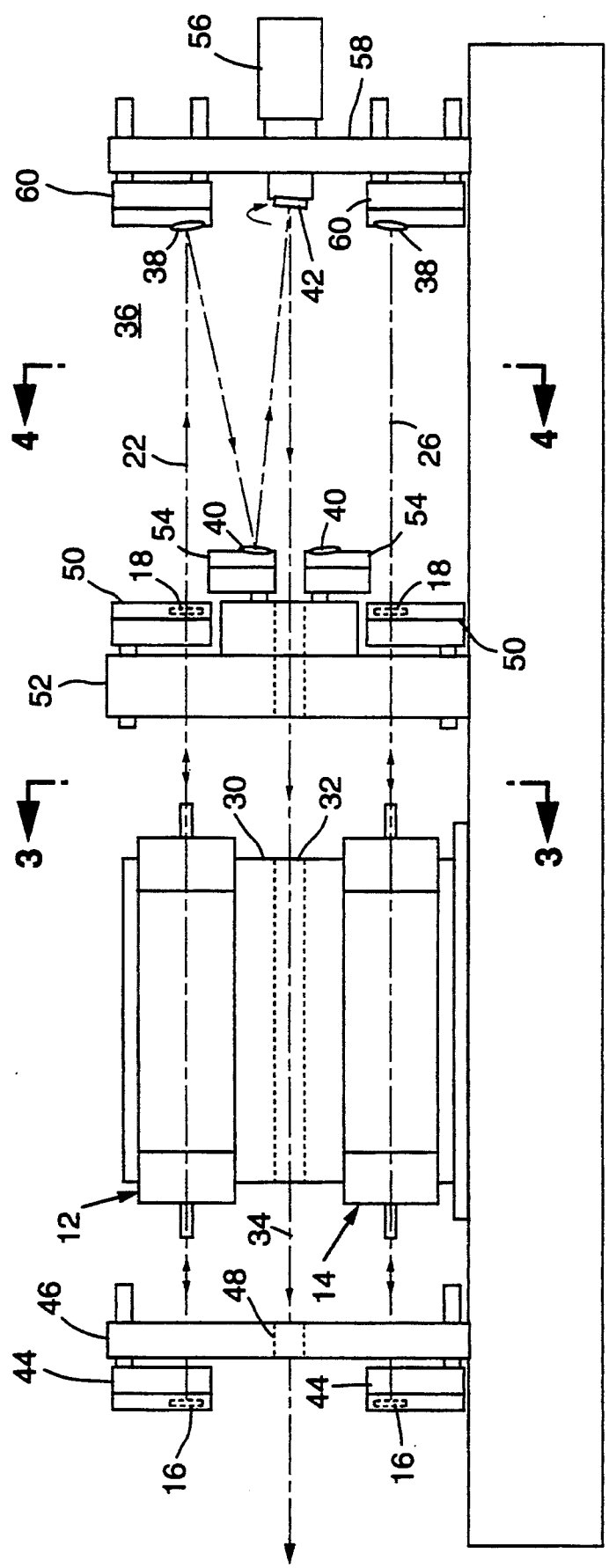
FIG. 2 is a side view of a preferred embodiment of the invention solid state laser.
Figure 4:
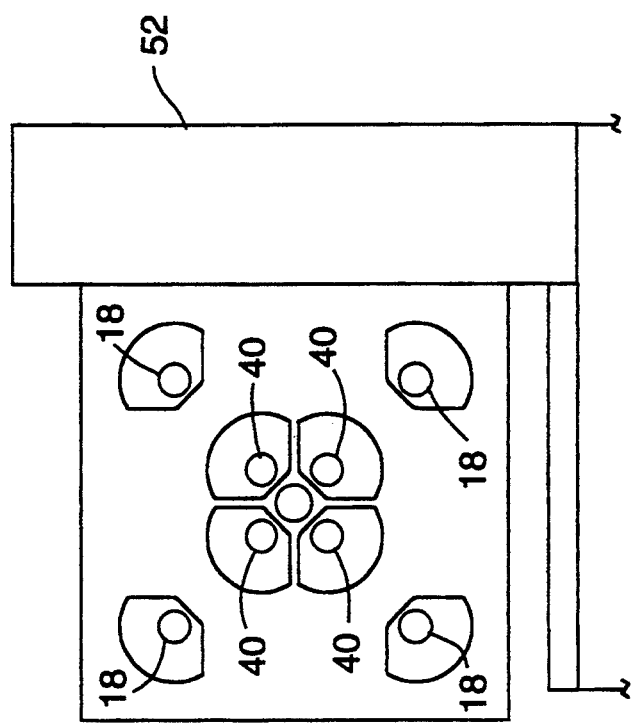
Figure 3:
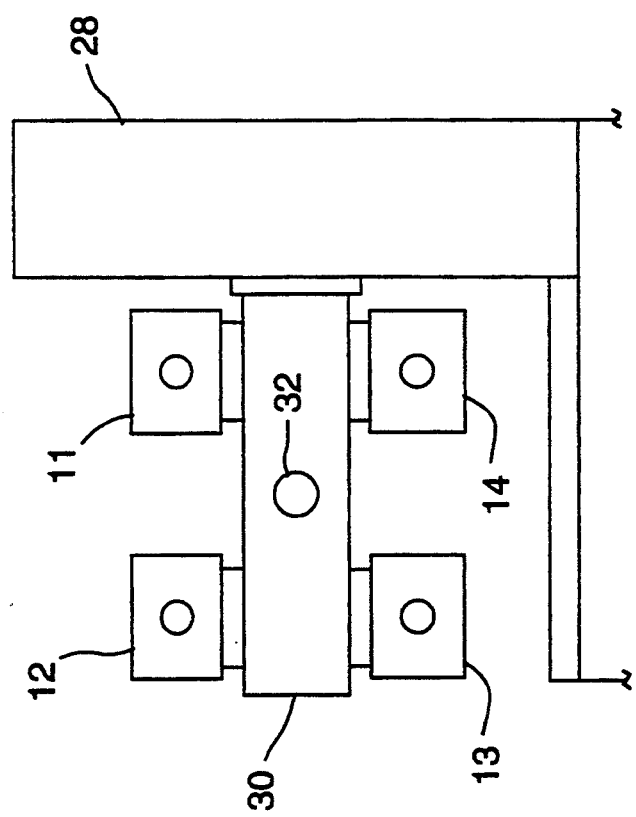
FIG. 3 is a cross-section view of the laser of FIG. 2 in a direction and location indicated by the arrows marked 3—3.

A preferred embodiment of the invention is now described referring to FIGS. 1–4, a solid state laser 10 is shown having four separate laser head assemblies 11–14. Associated with each laser head assembly are a pair of resonator mirrors 16 and 18 which define the laser cavity for each of the laser heads. Each of the mirrors 16 is totally reflecting and each of the mirrors 18 is partially transmissive in the standard manner.

When optically pumped, output beams 20, 22, 24 and 26 are provided for laser heads 11–14. The laser heads 11–14 are held and supported by a head support structure 28, which includes a horizontal support 30, shown in FIG. 2 which has a central hole 32. The interleaved pulsed output beam 34 from laser 10 passes through hole 32.

An optical path 36 is provided for each of the pulsed laser beam outputs 22, 24, 26 and 28 which includes mirror 38, a reflector 40 and a rotatable reflecting wedge 42. The output for each of the laser head assemblies is imaged on the mirror 38, which has a curved surface to focus the beam on the rotatable reflecting wedge 42. Reflector 40 is a mirror which is flat with no curvature. The surface of the reflecting wedge 42 from which the interleaved output beam 34 is formed has a curved surface so the output beam may be focused by a lens 35 for example, on the face of a fiber-optic surgical delivery tube.

Each of the resonator mirrors 16 are supported in mirror mounts, which are adjustably secured to a first resonator support 46, having a central hole 48 for passage of the output beam 34. Similarly, mirrors 18 are supported by mirror mounts 50 which are adjustably mounted to a second resonator support 52, which also supports reflector mounts 54. The rotatable reflecting wedge 42 is rotated by motor 56 both of which are mounted to support 58. Support 58 also secures mount 60 of output coupler 38 in an adjustable fashion.

As will be explained in greater detail in the following paragraphs, the rotatable reflector 42 is rotated sequentially to each of four positions.

When the reflector 42 is stopped in one of the four positions it provides an optical path, in combination with reflectors 38 and 40, from one of the laser heads 11-14 along a common output path 34. Each time the reflector 42 is in one of the four positions, the corresponding laser head is energized to provide a laser pulse onto the surface of rotatable reflector 42 and then along the output path 34. As the reflector 42 is rotated to each of the four positions, and each of the corresponding lasers is energized, a composite, interleaved pulsed laser output is provided from reflector 42 along the output path 34.

Figure 5:
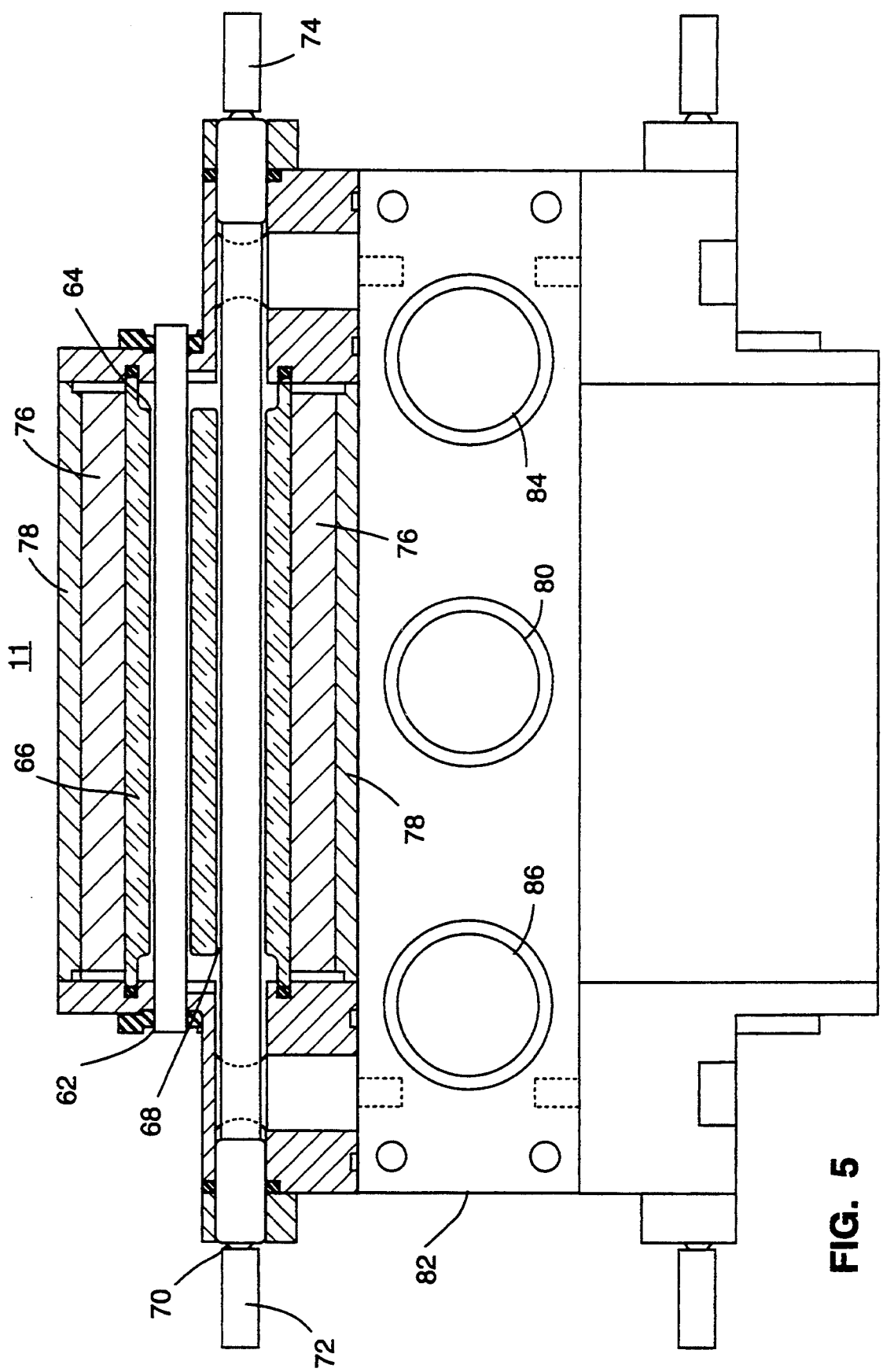
FIG. 5 is a bottom view, partially in section, of one of the laser heads shown in FIG. 2.

FIG. 5 shows one actual laser head assembly 11, in accordance with the present invention, of a type referred to as a diffuse reflector. The active lasing medium is a cylindrical Ho:YAG laser rod 62. The laser rod 62 fits within a first channel 64 of an oval-shaped, elongated dynasil glass enclosure 66. A second channel 68 in glass enclosure 66 houses an elongated flashlamp 70 for optically pumping laser rod 62. Flashlamp 70 is terminated with terminals 72 and 74. Surrounding the glass enclosure 66 is a jacket of $BaSO_4$ 76 which acts as a light reflector to maximize the efficiency of the pump source 70. The combination of the $BaSO_4$ 76 and glass enclosure 66 is encased in an aluminum housing 78.

Cooling for each of the laser head assembly does not require refrigeration, since each laser rod 62 is not pumped for maximum output. That is, the pump energy per laser pulse times the pulse rate is less for the laser of the present invention than typically used in a Ho:YAG laser with refrigeration cooling. Cooling is carried out by passing de-ionized water through the head assembly. Cooling water passes into inlet 80, through the laser head block 82 and out of outlet 84. A plug 86 permits access to the block 82. The Ho:YAG rod 62 is 3½ inches long and has a diameter of 4 mm.

Figure 6:
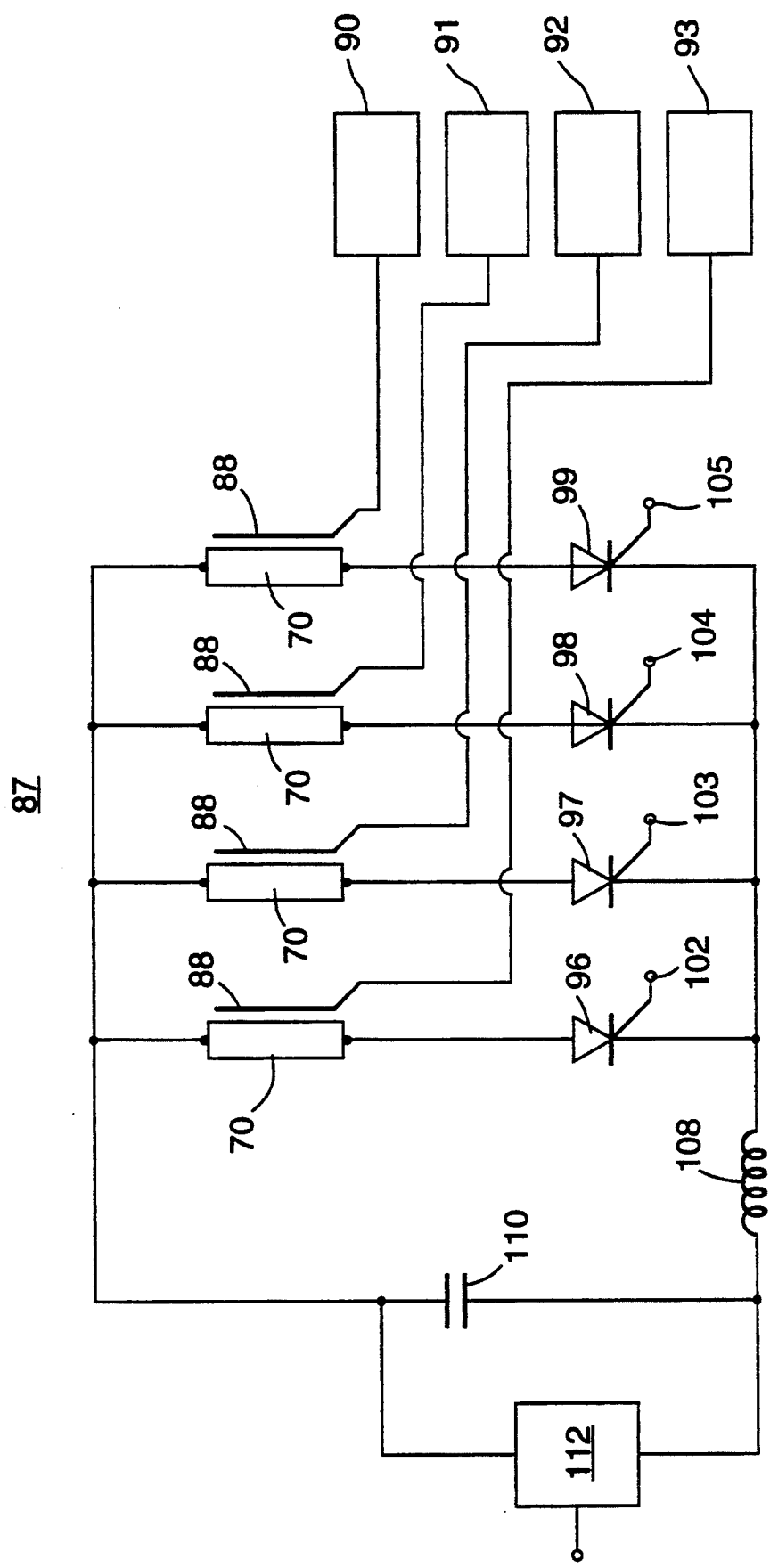
FIG. 6 is a schematic diagram of the high voltage power supply for the laser of FIG. 2.

FIG. 6 is a schematic diagram of the high voltage power supply 87 for sequentially triggering each of the flashlamps 70, which in turn pump each of the laser rods 62. Each of the flashlamps has associated with it an external trigger wire 88, which in turn is connected to an individual simmer power supply 90-93. Power supplies 90-93 maintain a sufficient electric field on each of the trigger wires 88 so that the gas within the flashlamps 70 is ionized and conducting. However, the level of conduction, approximately 100 milliamps, is low and so not enough light is emitted to trigger lasing of the rods 62.

Connected in series with the flashlamps 70 are SCRs 96-99, having gate electrodes 102-105, respectively. Each SCR is also connected to an inductor 108 and a capacitor 110. Capacitor 110 is charged by a regulated constant current source 112, which charges the capacitor 110 to approximately 1.5 KV.

In operation the flashlamps 70 are sequentially energized to a level which provides a high power burst of light to sequentially energize laser rods 62 in laser heads 11-14. This is accomplished by sequentially turning each of the SCRs 96-99 from an "off" state to an "on" state by putting a signal on the appropriate gate electrode 102-105. When this happens, capacitor 110 is discharged through the selected flashlamp 70.

Figure 7:
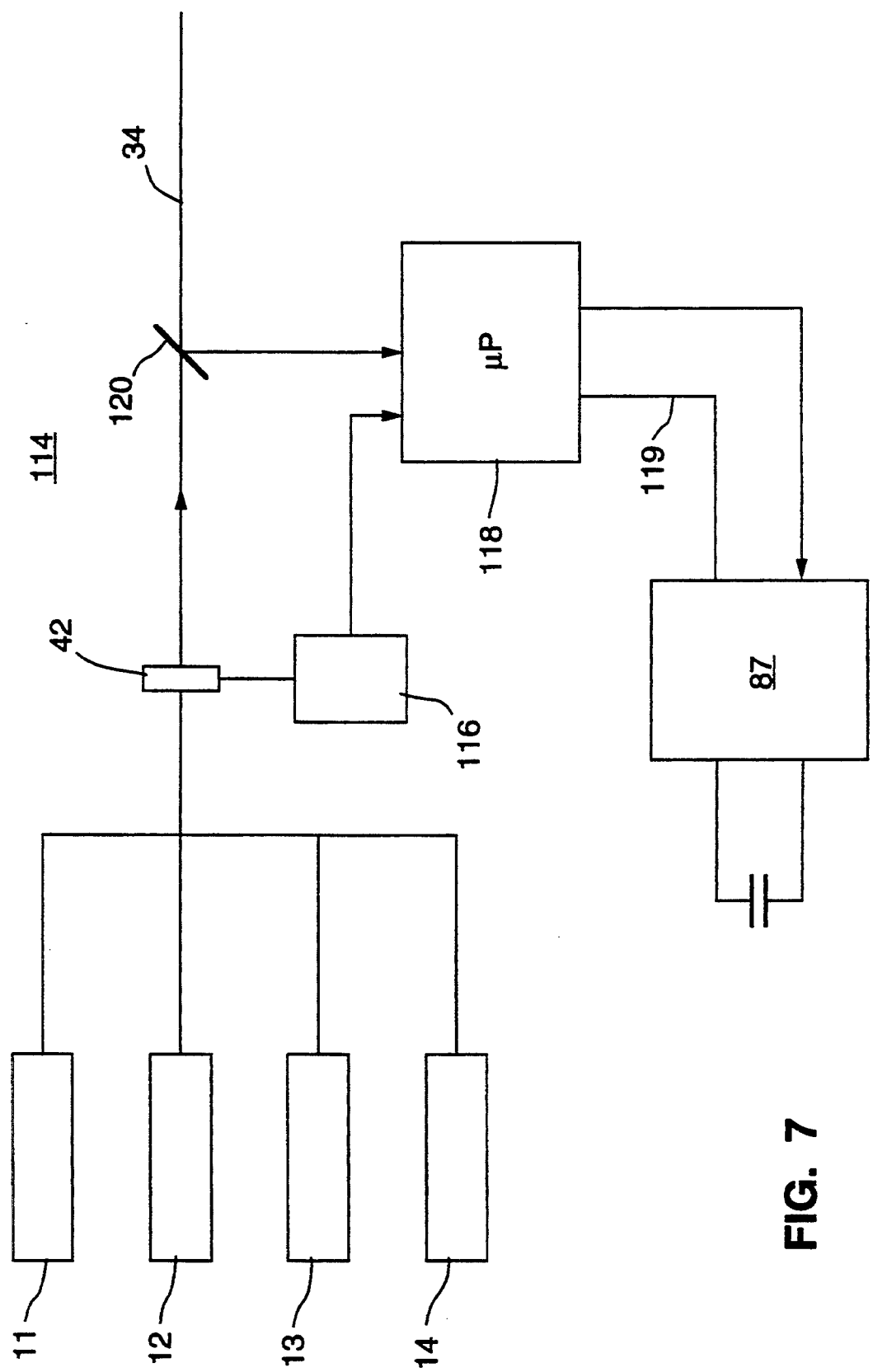
FIG. 7 is a block schematic diagram of the control circuit for the power supply of FIG. 6.

Operation of circuit 87 will be further explained with additional reference to FIG. 7 which is a block schematic diagram of the capacitor and SCR control circuit 114. An encoder 116 senses the position of the rotating reflecting wedge 42. This positional information is fed a microprocessor 118, which in turn controls the sequence and timing of the switching of SCRs 96-99. That is, when the rotating wedge is in position to accept the output beam from laser head 11, the SCR of the corresponding flashlamp is turned on via line 119 and the corresponding laser rod is energized. This occurs again each time the rotating wedge 42 is ready for the beam from the next laser head.

Each of the laser rods 62 has a somewhat different efficiency associated with it. Since it is important that the composite output beam 34 have pulses of the same magnitude, this difference in individual laser rods must be accounted for. This is accomplished by controlling the regulated current source 112 and the level to which capacitor 110 is charged.

The output power of each laser rod is measured empirically and the degree to which the capacitor must be charged to maintain equal output pulses from each laser rod is stored in a look-up table in microprocessor 118. Additionally, feedback is provided to maintain constant output pulses. An optical pick-off 120 samples each output pulse and a signal indicative of the magnitude of the pulse is sent to microprocessor 118. Based upon the look-up table and the fact that the output from each flashlamp is proportional to the square of the voltage on capacitor 110, microprocessor 118, by controlling current source 112, controls the voltage stored on capacitor 110 for each laser rod, which in turn determines the output from each flashlamp.

In an actual embodiment motor 56 is supplied by the Escape Co. It makes one full revolution every 100 milliseconds. It makes a stop four times, for a stop time period of 5 msec. Capacitor 110 is one actual embodiment is 140 uf and inductor 108 is 300 microhenries. Flashlamps 70 have cerium-doped quartz envelopes and are filled with xenon gas at a pressure of 1000 torr. The combined power from the four flashlamps 70 is approximately 5000 watts.

Figure 8:
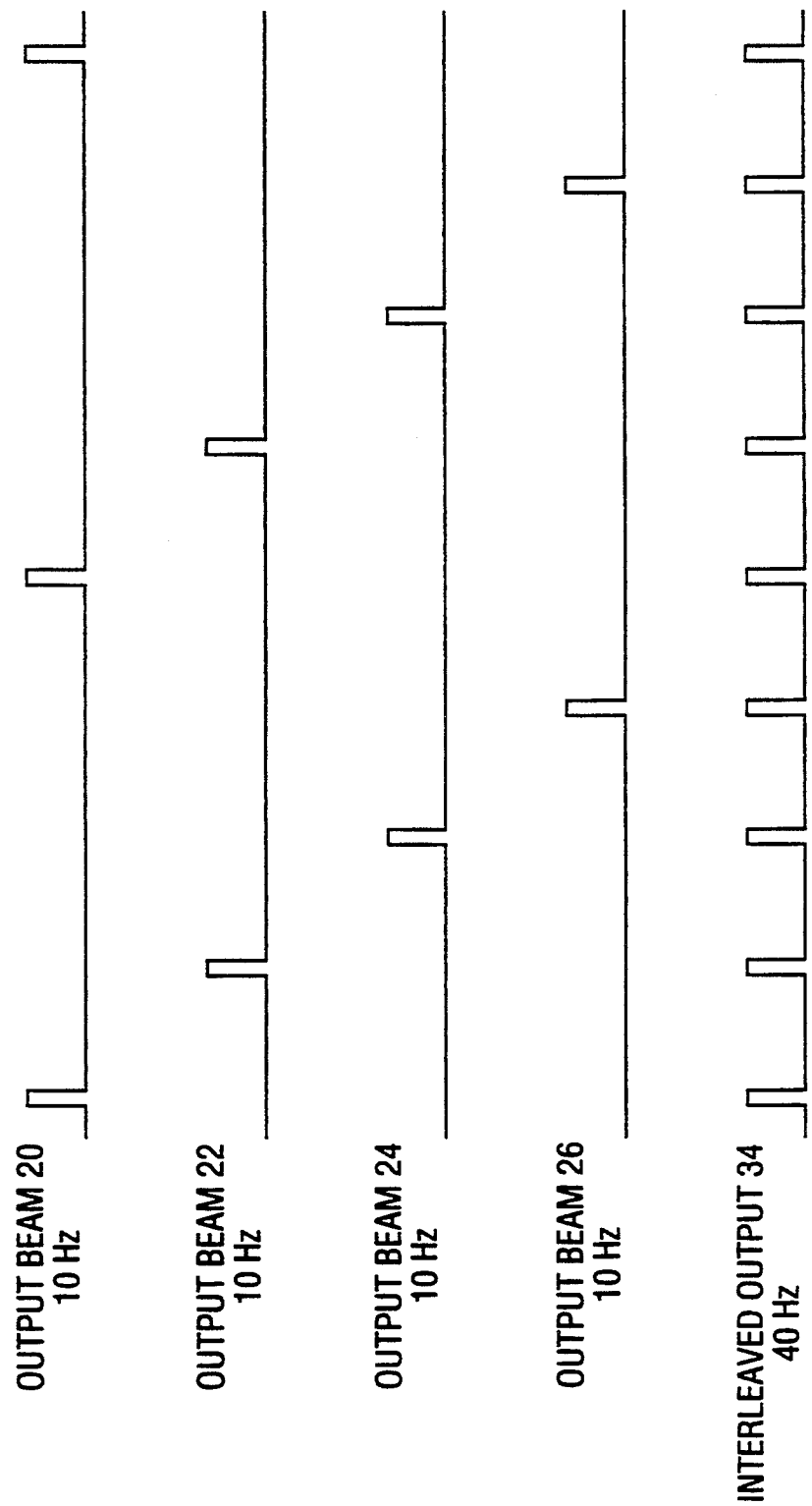
FIG. 8 is a timing diagram showing the relationship of the individual laser outputs and the combined, interleaved beam.

FIG. 8 is a timing diagram showing the relationship between the outputs from each of the individual rods. In one actual embodiment, using Ho:YAG rods in head assemblies 11-14, each is pulsed at a 10 Hz repetition rate. The resulting interleaved output beam 34 has a repetition rate of 40 Hz. It should be understood that the present invention is not limited to a particular number of individual rods or a particular repetition rate. What is important is that the average pump power be kept below that for maximum output power for any given rod. Since power is equal to the pump energy times the pump repetition rate, both can be varied in pumping the individual laser rods sufficient time following each pump input light pulse to allow thermal relaxation in the laser rods, so that temperature build-up is not sufficiently large to require refrigeration cooling.

While the foregoing laser has been described for the embodiment of Ho:YAG laser rods, other solid state lasers may be used, in accordance with the present invention. Further, the individual lasers to be combined need not be of the same wavelengths, so that the affects on tissue can be varied. That is, the individual laser rods may be of different materials resulting in different pulse characteristics within the interleaved output 34.

The optical system of the present invention is unique in several respects. It is both compact and it provides an interleaved output beam whose size (diameter) is independent of pump power, and even though thermal lensing gets stronger as the laser rods are pumped at greater power levels. The optical system also is unique in that it provides a laser beam of constant numerical aperture (beam divergence) inside an optical fiber delivery system. Also, it is arranged in a way that even if the rotating reflector 42 is somewhat out of position relative to the laser beams, the action of the laser beam at the input to the optical fiber remains fairly constant. To realize all three features at the same time, the point of constant beam diameter inside the laser is first imaged onto the moving element and this image is then relayed to the input end of the fiber. Simultaneously, the second point of constant image size is imaged to the focusing lens that produces the final image on the fiber.

Figure 9A:
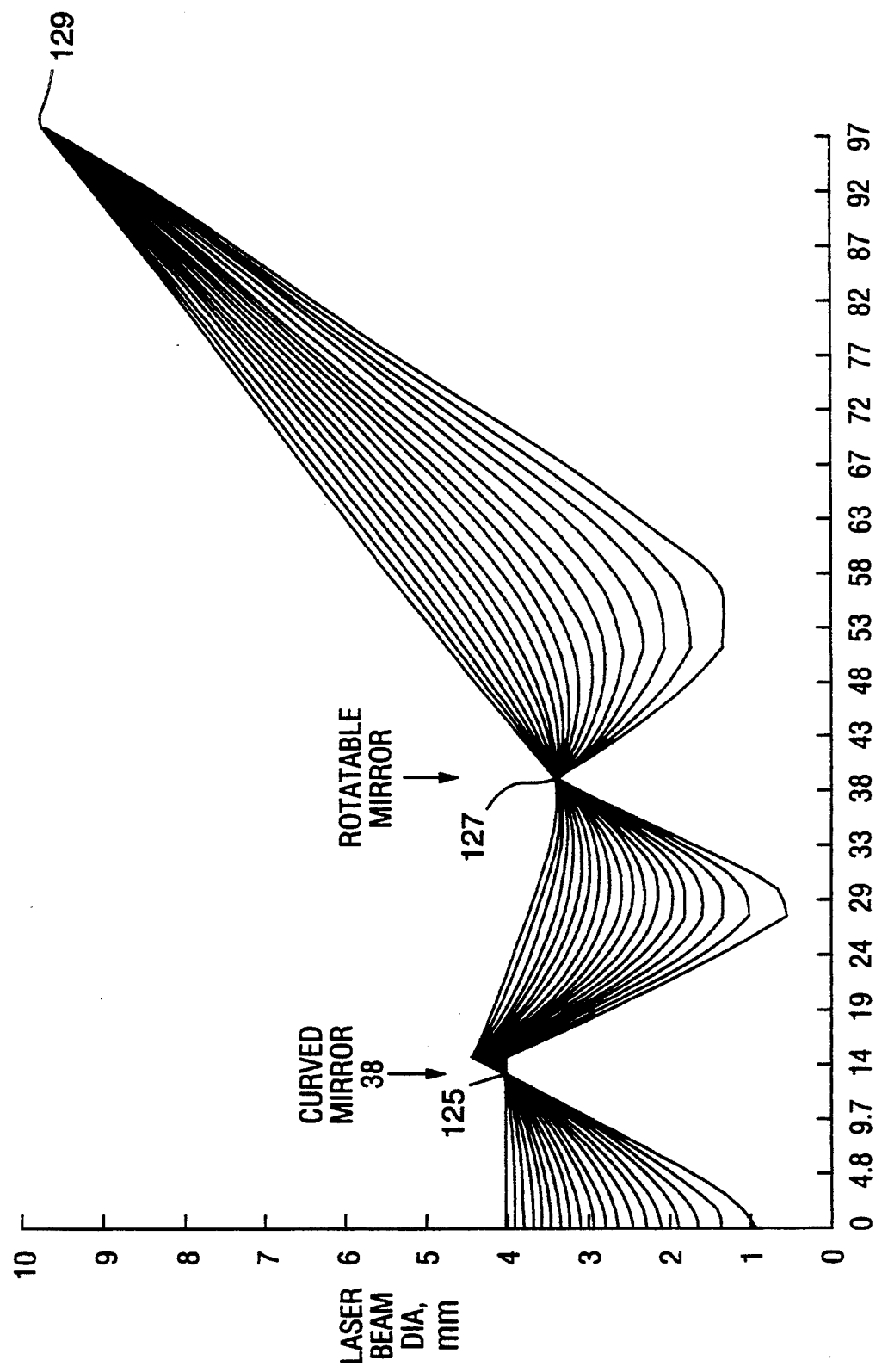

This is best understood by additionally referring to FIG. 9A, where the x-axis represents the distance as measured along the optical path from one of the output couplers 18 of one of the laser heads 11-14. The y-axis represents the beam diameter from the laser head and the series of lines represent the beam diameter as a function of the pump power. It can be seen, for example, that the output beam diameter varies from 1 to 4 mm, depending upon the pump power. The laser resonator is designed to image the beam to a spot 125 which corresponds to the surface of the curved mirror 38, which is positioned approximately 15 cm from output coupler 18.

The mirror 38 is concave with a curve to re-focus the laser beam to a spot 127, which corresponds to the surface of the rotatable mirror 42. As can be seen from FIG. 9A and and FIG. 1 this occurs at a distance of approximately 40 cm from output coupler 18. Rotatable mirror 42 also has concave, curved, surface and focuses the beam to a spot 129 on lens 35, which may be part of an optical fiber surgical delivery tube 37, where lens 35 focuses the beam, in the well-known manner, onto one end of an optical fiber or fiber bundle 37.

It is well known that in any laser cavity with a gain medium of finite transverse dimension, the limit in the width of the gain medium defines a point where the beam width is constant regardless of laser power. That is to say, that at a point within each of the laser cavities the laser beam has the same width as the gain medium. The output coupler 18 re-focuses an image of this point, corresponding to spot 127, onto the rotatable mirror 42, and thereafter the image of this point is refocused at the input to the optical fiber 37. In this manner the output laser beam provided to the input to the optical fiber surgical delivery tube will be the same size regardless of pump power. This is seen graphically in FIG. 9B. Point 131 is the location of the input to fiber 37.

Figure 9C:
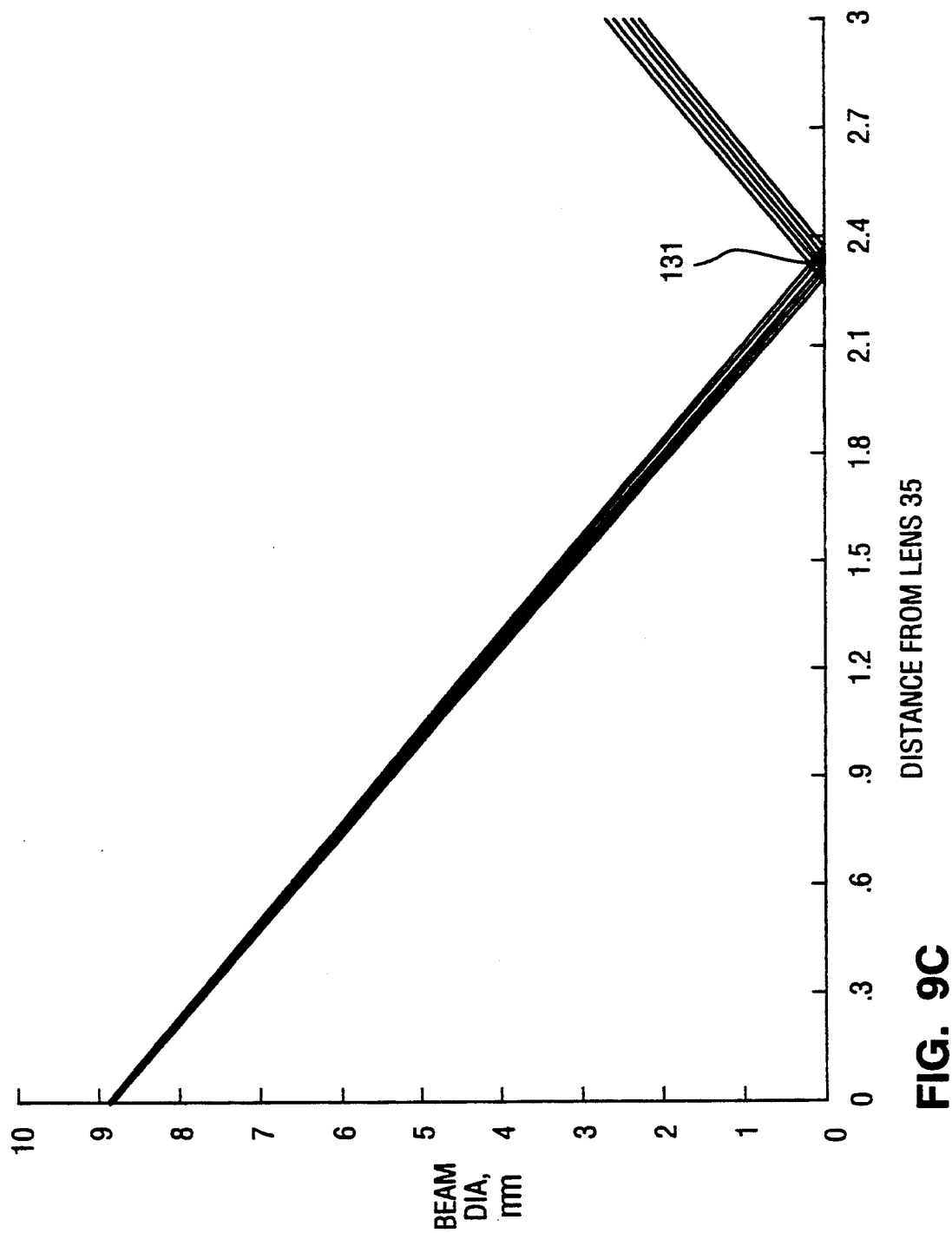

It has been determined that in addition to the point of constant beam diameter inside each laser, there is a second point of constant beam diameter outside of each of the lasers. This corresponds to point 125 in FIG. 9A. By re-focusing this second point of constant beam diameter on the fiber focusing lens 35, which is spot 129 in FIG. 9A, the resulting laser beam has the desirable property of having a constant numerical aperture (beam divergence) inside the optical fiber regardless of changes in optical power. This beneficial result of one actual laser embodiment is shown in FIGS. 9A to 9C. The origin represents the location of the fiber focussing lens 35. Little change in beam divergence is present even with changes in laser power.

As noted the system is configured so that the image on the rotatable mirror 42 is re-imagined on the optical fiber 37. The result of this is that rotation of the moving element produces only a rotation of the element on the fiber 37, but no translation of the image on the fiber. Consequently small errors in the position of rotatable mirror 42 do not produce errors in the location of the laser beam at the input to fiber 37. Instead variations in the position of the moving element produce small changes in the input angle of the beam inside fiber 37. The optical fibers tend to be more tolerant of these errors.

In one actual embodiment, resonator mirror or coupler 16 has a radius of curvature of 100 cm and is located 11 cm from one end of the Ho:YAG laser rod 62. Output coupler 18, which is 84% reflecting within the laser cavity, is provided with an outside convex curvature, with a radius of curvature of 30 cm. Coupler 18 is positioned 11 cm from the opposite end of the Ho:YAG laser rod 62. Reflector 38 has a focal length of 13.47 cm, rotatable reflector 42 has a focal length of 18.24 cm, and lens 35 has a focal length of 2.4 cm.

Each of the reflectors 40, in combination with the other optical components, provides an important function of allowing the optical system to be compact. Also, reflectors 40 allow each of the beams 22, 24, 26 and 28 from the individual lasers, to be directed at rotatable reflector 42 at small angle to the interleaved output beam 34. This allows the mechanical components, including the rotatable reflector 42, to have greater mechanical tolerances, thereby making the system less expensive to manufacture and maintain. Mirror 38 and rotatable mirror 42 need not be reflectors. They can be built as convex lenses as well.

Figure 10:
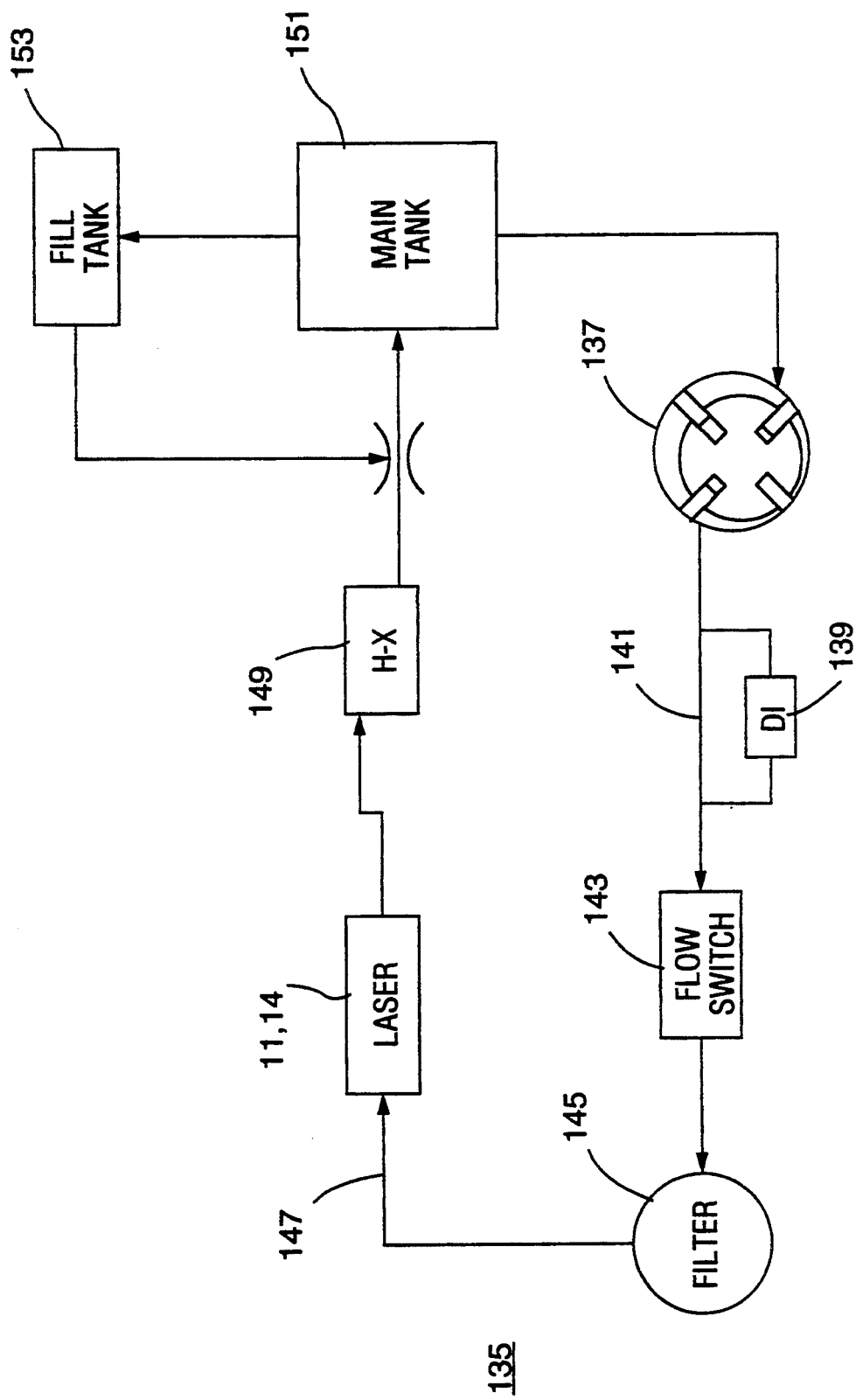
FIG. 10 is a block schematic diagram of the cooling system for the laser system of the present invention.

FIG. 10 illustrates details of the cooling system 135 used in one actual embodiment to cool laser heads 11-14. A single pump 137 is used for all of the laser heads. Pump 137 is a positive-displacement pump which provides a constant flow of about 4 gallons/min of water coolant, regardless of pressure. A deionizing cartridge 139 is put in parallel with the main conduit 140, to keep the water-coolant non-conducting. A flow switch 143 provides the safety function of shutting down the system if no water is circulating. Prior to entering the laser heads the cooling water passes through a filter 145 to remove particulate material.

Figure 11:
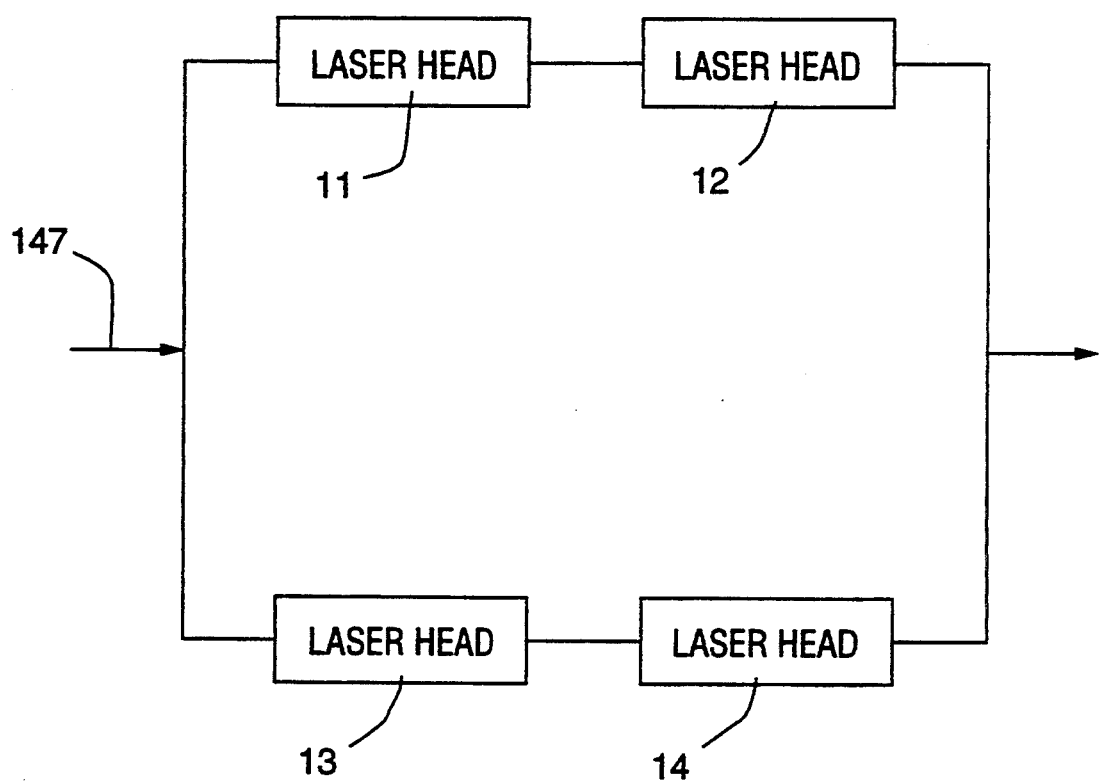
FIG. 11 shows the relationship of the laser heads in the cooling system.

Next, the cooling water passes at 147 through the laser heads, which are arranged with 2 laser heads in series with each other, and each pair in parallel with each other. This arrangement is shown in FIG. 11. The resulting flow through each laser head is approximately 1 gallon per minute. Referring to FIG. 5, a very small space 67 of 0.4 mm is provided between the glass enclosure 70 and around each laser rod 62. Thus, water at high velocity at a Reynold's number greater than 10,000 passes by the laser rods. Space 69 also is provided around the flashlamps 70 so they are cooled along with the laser rods.

The cooling water, now heated, flows through a heat exchange system 149 which is air-cooled by a fan (not shown) in the well-known manner. Water exits the heat exchanger at near ambient temperatures and then flows through a venturi 151 which introduces turbulence into the flow. The water then flows into a main holding tank 151 which acts in a manner equivalent to a mechanical "fly wheel." That is, by having a tank with the capacity to store several gallons of water, the lasers can be operated at maximum output power for extended periods of time, since the additional water in the system can absorb additional heat generated in the laser heads. A fill tank 153 is used to "top-off" the main tank 151 as is necessary.

Figure 12:
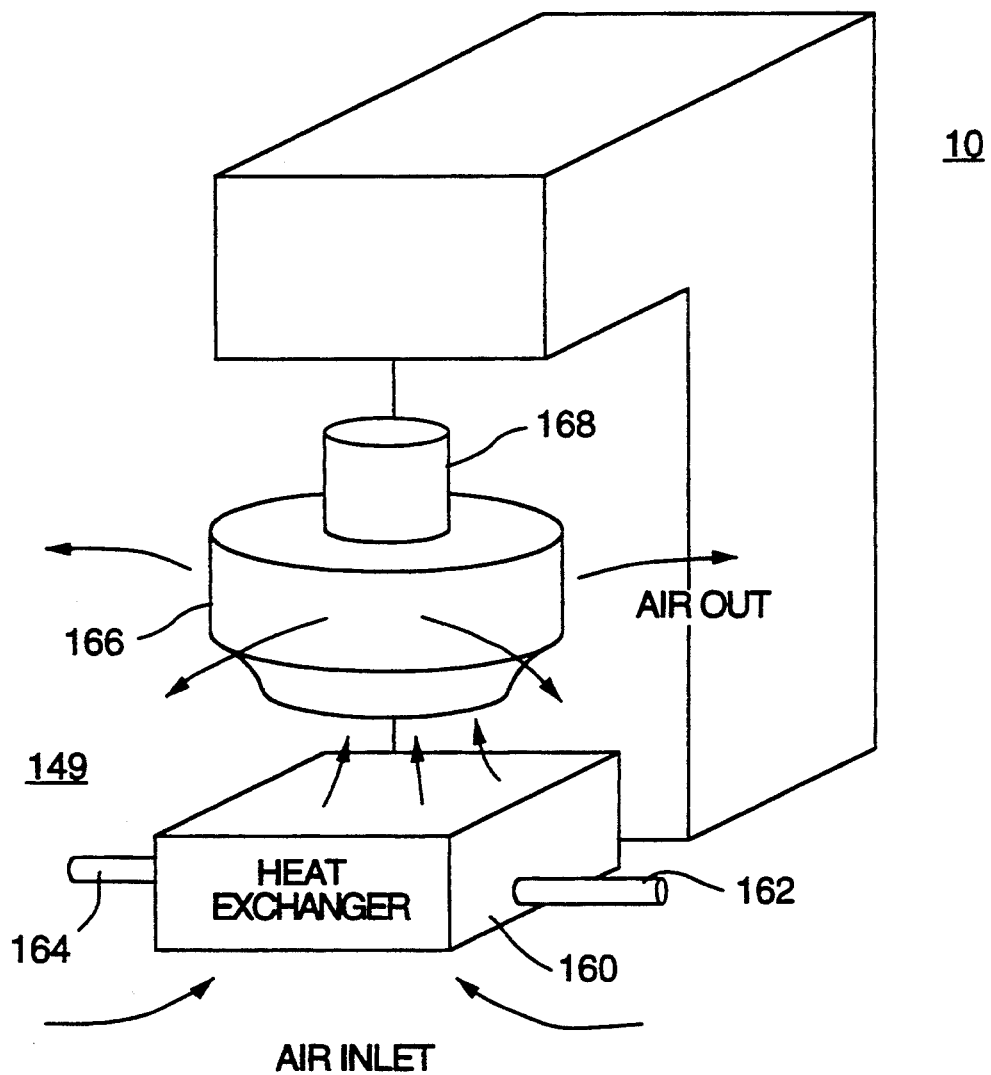
FIG. 12 illustrates the heat exchanger of FIG. 11 in greater detail.

Details of the heat exchange system are shown in FIG. 12. The actual heat exchanger 160 is conventional with a water inlet 162 and a water outlet 164. Coils of pipes thru which the water flows (not shown) are provided within the heat exchanger 160. Air for cooling enters at the bottom of the heat exchanger 160 and exits from the top.

Air is drawn thru the heat exchanger by a backward curved impeller fan driven by a fan motor 168. A characteristic of such a fan is that air enters the fan axially, in this case at the bottom, and is then expelled radially, as shown by the arrows in FIG. 12.

The heat exchanger is very compact, measuring approximately 1 foot square and 5 inches in thickness. Such a heat exchanger requires large volumes of air to pass thru it, resulting of a large pressure drop across it. The use of a backward curved impeller is ideal for this application because it is compact, powerful, and directs the air out radially.

It has been found, in one particular embodiment, that the optical pump repetition rate for the laser rods can be as high as 7 Hz with no loss in output power. As the repetition rate gets higher the output begins to drop because the thermal time constant of the Ho:YAG rod doesn't allow sufficient thermal relaxation to occur. Above approximately 10 Hz the output drops more rapidly. It should be noted, however, that the specifics of the foregoing characteristics will change depending upon the pump and optical systems and the individual laser rod design.

We claim:

1. A solid state laser apparatus comprising:
   a plurality of holmium doped laser rods;
   means for sequentially optically pumping each of said plurality of holmium doped laser rods at an average power level below that which maximizes the laser output from each of said holmium doped laser rods;
   said sequentially optically pumping occurs at a repetition rate which is less than a thermal relaxation time of said plurality of holmium doped laser rods;
   optical means for interleaving the outputs from each of said holmium doped laser rods into a pulsed output beam; and
   means for liquid cooling said plurality of holmium doped laser rods, without refrigeration, at ambient temperature or above.

2. A laser as recited in claim 1 wherein said repetition rate is equal to or less than approximately 10 Hz per laser rod.

3. A laser as recited in claim 1 wherein said repetition rate is approximately 7 Hz per laser rod.

4. A method of operating a solid state laser comprising steps of:
   sequentially optically pumping a plurality of holmium doped laser rods at average power levels below that which maximizes the laser output from each of said laser rods;
   said sequentially optically pumping occurs at a repetition rate which is less than a thermal relaxation time of said plurality of holmium doped laser rods;
   combining each of the laser outputs from said plurality of holmium doped laser rods into a single pulsed output beam; and
   liquid cooling said plurality of holmium doped laser rods, without refrigeration, at ambient temperature or above.

5. The method of claim 4 wherein the step of combining the outputs of each of the laser rods includes the steps of:
   providing an optical path from each of said laser rods to a rotatable reflector;
   rotating the rotatable reflector in incremental steps and at a rate equal to the desired output of laser pulses; and
   directing the reflected laser pulses as an interleaved stream of pulses along a common output path.

6. The method of claim 5 herein the step of optically and sequentially pumping includes the steps of:
   energizing a flash lamp for the first laser rod when the rotating reflector is in a first position; and
   energizing a flash lamp for the each of n laser rods when the rotating reflector is in each of n incremental positions, wherein n is a positive number.

7. The method of claim 4 wherein the pumping step comprises the step of sequentially pumping four holmium doped laser rods.

8. The method of claim 7 wherein said repetition rate is equal to or less than approximately 10 Hz per laser rod.

9. The method of claim 7 wherein said repetition rate is approximately 7 Hz per laser rod.

* * * * *